(12) United States Patent
Elshafei (10) Patent No.: US 8,367,995 B2
(45) Date of Patent: Feb. 5, 2013

(54) SYSTEM AND METHOD FOR AUTOMATIC POSITIONING OF A SOLAR ARRAY (75) Inventor: Moustafa Elshafei, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 176 days.

(21) Appl. No.: 13/033,434

(22) Filed: Feb. 23, 2011

(65) Prior Publication Data
US 2012/0211001 A1 Aug. 23, 2012

(51) Int. Cl.
F24J 2/38 (2006.01)
(52) U.S. Cl. .................. 250/203.4; 250/203.1; 126/573; 126/600
(58) Field of Classification Search ............... 250/203.1, 250/203.3, 203.4, 214 R; 126/573, 574, 126/576, 600, 601, 605; 136/244, 252
See application file for complete search history.

(56) References Cited

U.S. PATENT DOCUMENTS

| | | |
|---|---|---|
| 3,630,020 A | 12/1971 | Chase et al. |
| 4,302,710 A | 11/1981 | Menser et al. |
| 4,349,733 A | 9/1982 | Beam et al. |
| 5,914,483 A | 6/1999 | Fallon et al. |
| 6,019,320 A | 2/2000 | Shah et al. |
| 7,507,941 B2 | 3/2009 | Yeh et al. |
| 7,518,792 B2 | 4/2009 | McWilliams |
| 8,253,086 B2 * | 8/2012 | Zalusky et al. ............ 250/201.3 |
| 2008/0066735 A1 | 3/2008 | Yeh et al. |
| 2009/0056700 A1 | 3/2009 | Lin et al. |
| 2009/0126774 A1 | 5/2009 | Taylor et al. |
| 2010/0000517 A1 | 1/2010 | Zalusky |
| 2010/0102202 A1 | 4/2010 | Sherman |
| 2010/0108860 A1 | 5/2010 | Sherman et al. |
| 2012/0191351 A1 * | 7/2012 | Kerrigan et al. .................. 702/3 |

* cited by examiner

Primary Examiner — Kevin Pyo
(74) Attorney, Agent, or Firm — Richard C. Litman (57) ABSTRACT The system and method for automatic positioning of a solar array utilizes modular neural processors pre-trained from existing solar data to estimate the direction of the sun at any location and at any time, irrespective of the orientation or movement of the base unit, and to determine solar panel servo tracking system steering commands for optimal orientation of the solar panel surfaces towards the sun. The automatic positioning system may be used in power generation or water desalination facilities. The device integrates a GPS system, an electronic compass, and an inclination sensor for determination of the orientation of the base unit. Periodic control commands are issued to conventional servo systems for automatic steering of a solar array for maximum solar power acquisition to optimize energy gain versus energy consumption in steering.

20 Claims, 8 Drawing Sheets

SYSTEM AND METHOD FOR AUTOMATIC POSITIONING OF A SOLAR ARRAY

BACKGROUND OF THE INVENTION

1. Field of the Invention

The present invention relates generally to tracking and positioning systems, and particularly to a system and method for automatic positioning of a solar array.

2. Description of the Related Art

There is an increasing interest in the utilization of solar energy in varieties of applications, such as power generation, water desalination, irrigation, and agricultural industry. Solar energy is usually captured by photovoltaic panels or by solar receivers. In order to maximize the utilization of the available solar energy, there is a need to orient the solar panels surfaces or solar reflector surfaces for maximum solar energy acquisition. A solar tracker is a generic term used to describe devices that orient various payloads toward the sun. Payloads can be photovoltaic panels, reflectors, lenses or other solar receivers.

In conventional photovoltaic (PV) applications, trackers are used to minimize the angle of incidence between the incoming light and a photovoltaic panel. This increases the amount of energy produced from a fixed amount of installed power generating capacity. In concentrated photovoltaic and concentrated solar thermal applications, trackers are used to orient reflectors or optical systems to accept or redirect sunlight, and therefore must be oriented appropriately to maximize the energy collected.

Solar trackers may be active or passive, and may be single axis or dual axis. Single-axis trackers usually use a polar mount for maximum solar efficiency. Single-axis trackers will usually have a second axis, the tilt axis, which is manually adjusted on regular intervals throughout the year. Compared to a fixed mount, a dual-axis tracker increases annual output by approximately 30%, Two-axis servo trackers allow the solar panel to move in two directions. One axis of support is horizontal (called the altitude), and allows the solar panel to tilt up and down. The other axis is vertical (called the azimuth), and allows the solar panel to swing in a circle parallel to the ground. This makes it easy to position the solar panel. Swing it around in a circle, and then lift it to the target. The steering system consists of one or two motor control mechanisms, which can be remotely and/or automatically operated using various types of sun sensors.

A tracking system that does not require optical solar sensing elements would be beneficial.

Thus, a system and method for automatic positioning of a solar array solving the aforementioned problems is desired.

SUMMARY OF THE INVENTION

The system and method for automatic positioning of a solar array utilizes modular neural processors pre-trained from existing solar data to estimate the direction of the sun at any location and at any time, irrespective of the orientation or movement of the base unit, and to determine solar panel/solar reflector servo tracking system steering commands for optimal orientation of the solar array surfaces towards the sun. The automatic positioning system may be used in power generation or water desalination facilities. The system integrates a GPS system, an electronic compass, and an inclination sensor for determination of the orientation of the base unit. Periodic control commands are issued to conventional servo systems for automatic steering of solar beam tracking assemblies for maximum solar power acquisition to optimize energy gain versus energy consumption in steering.

A Global Position System (GPS) receiver, a tilt sensor, and an electronic compass are used for continuous and automatic compensation of the setup errors. Moreover, the aforementioned devices are also used in continuous computation of the direction of the base unit with respect to true north. As such, the system is particularly useful for use in mobile systems or systems that are in continuous movement, as in ships, RVs, military, and humanitarian relief missions, yachts, trucks, and other mobile applications.

The system includes a user interface, a real-time calendar/clock, an electronic interface to a GPS receiver, an electronic compass, and a tilt sensor. Moreover, the system includes a low cost microcontroller and one or more neural computation structures in hardware or firmware, a processing method, and a procedure for periodically estimating the direction of the sun and the corresponding best orientation of the solar collecting device. The system operates in conjunction with the conventional one-axis and two-axis motorized or hydraulic servo systems used for steering such solar collecting devices as solar panels, solar reflectors, and similar systems. A simple modular neural computation architecture for efficient estimation of the sun direction is implemented using low cost embedded controllers or low cost ASIC hardware. Moreover, the neural modular computational structures can be trained from actual data, and can be scaled to achieve any desired accuracy.

The system is intelligent enough to compensate for system misalignments and to operate automatically by acquiring position and orientation information using appropriate sensors, and taking the actions accordingly. The system is a truly automated plug and play system, requiring no operator training, and eliminates lengthy and tedious analysis and adjustments. The system interfaces directly to any conventional servo positioning systems using open industry standard interfaces. This feature allows the system to be used with a wide range of servo systems and solar panel sizes, and to control any number of solar collectors connected in a digital bus.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The system and method for automatic positioning of a solar array utilizes modular neural processors pre-trained from existing solar data to estimate the direction of the sun at any location and at any time, irrespective of the orientation or movement of the base unit, and to determine solar panel servo tracking system steering commands for optimal orientation of the solar panel surfaces towards the sun. The automatic positioning system may be used in power generation or water desalination facilities. The device integrates a GPS system, an electronic compass, and an inclination sensor for determination of the orientation of the base unit. Periodic control commands are issued to conventional servo systems for automatic steering of a solar array for maximum solar power acquisition to optimize energy gain versus energy consumption in steering.

The system is not based on sensing the direction of the solar energy, but rather on the determination of the direction of the solar beam using computational methods. The device, however, requires knowledge of the position and local time of the solar panels, which can be obtained automatically by a standard GPS, or manually from the user through keyboard input. Moreover, the subject matter described herein can be implemented using a computer readable medium having stored thereon computer executable instructions that, when executed by the processor of a computer, perform the steps described herein. Exemplary computer readable media suitable for implementing the subject matter described herein include chip memory devices, disk memory devices, hard drive memory devices, programmable logic devices, and application specific integrated circuits. In addition, a computer readable media that implements the subject matter described herein can be located on a single computing platform, or may be distributed across multiple computing platforms.

Figure 1:
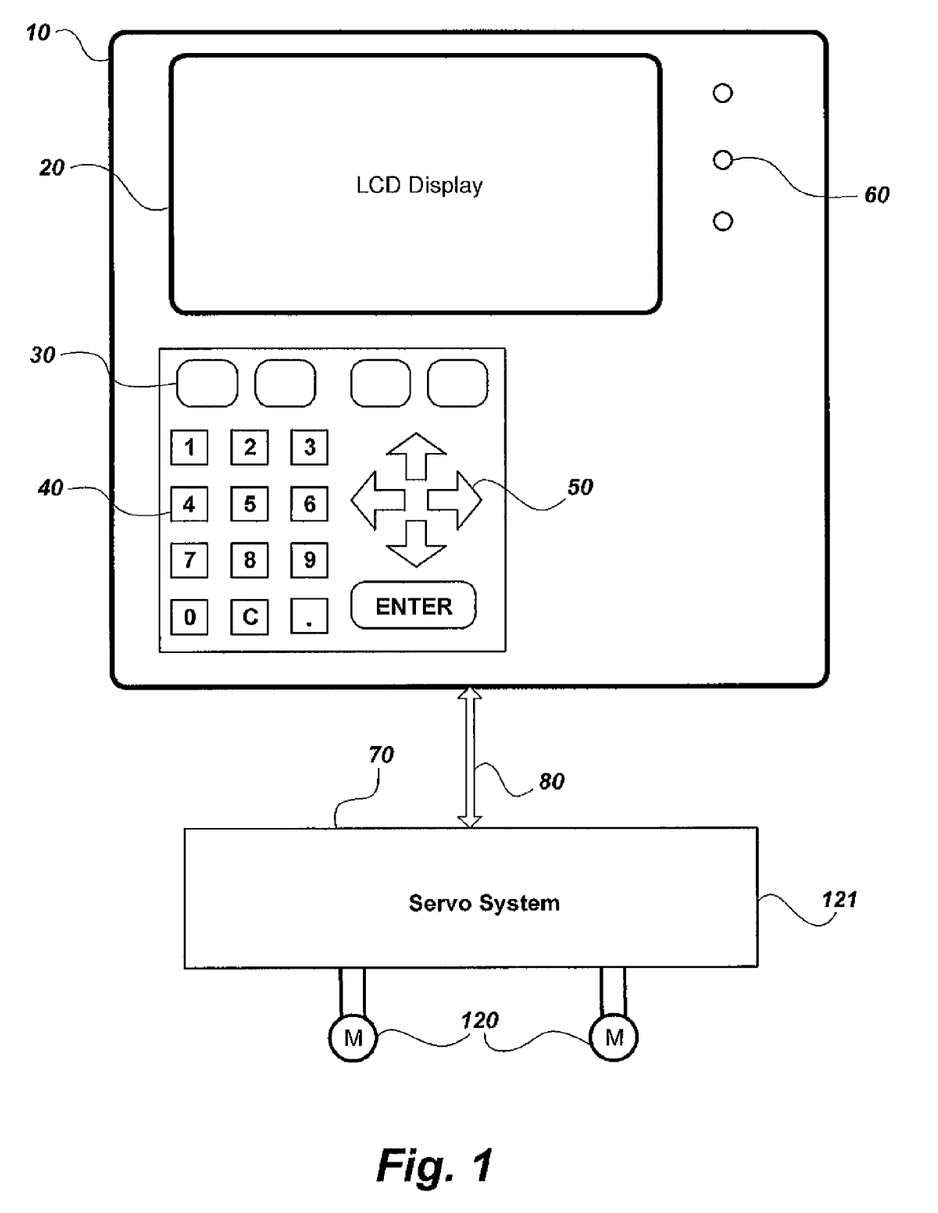
FIG. 1 is a diagrammatic front view of a control panel in a system for automatic positioning of a solar array according to the present invention.
Figure 2:
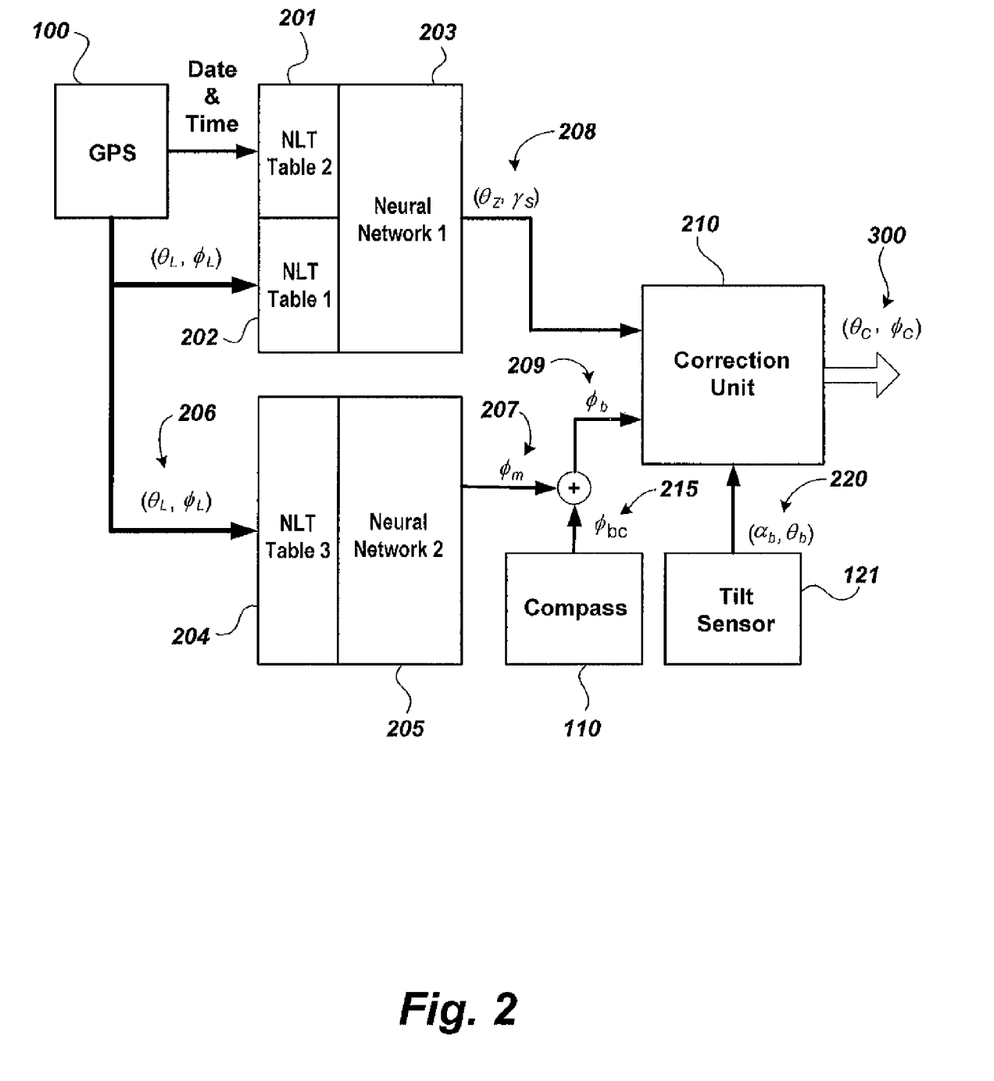
FIG. 2 is a block diagram of selected system components of a system for automatic positioning of a solar array according to the present invention.

An overview of exemplary control panel is depicted in FIG. 1. The system 10 includes an LCD 20, a keyboard 40, LED status indicators 60, and an appropriate interface 70 to an external, conventional solar panel steering servo control system bus 80. As shown in FIG. 2, the system includes a GPS unit 100 for determination of local position and time, an electronic compass unit 110 for determination of the orientation of the mounting base of the solar panel, and possibly an electronic tilt sensor 121 for correction of errors due to the inclination of the mounting base assembly.

Signal processing, as shown in FIG. 2 is accomplished by a plurality of neural networks 203 and 205, which feed a correction unit 210. The system features an automatic mode in which it periodically (e.g., every 15 minutes) obtains the local position, the latitude and longitude ($\theta_L$, $\Phi_L$) 206, and the local time from the GPS unit 100. If GPS reception is not available, the system reads the date and time information from the internal real-time hardware clock 390, and uses the previously stored values of the local position. The latitude and longitude are then normalized by a first non-linear transformation table 202, the date and time being normalized using a second non-linear transformation table 201.

Figure 4:
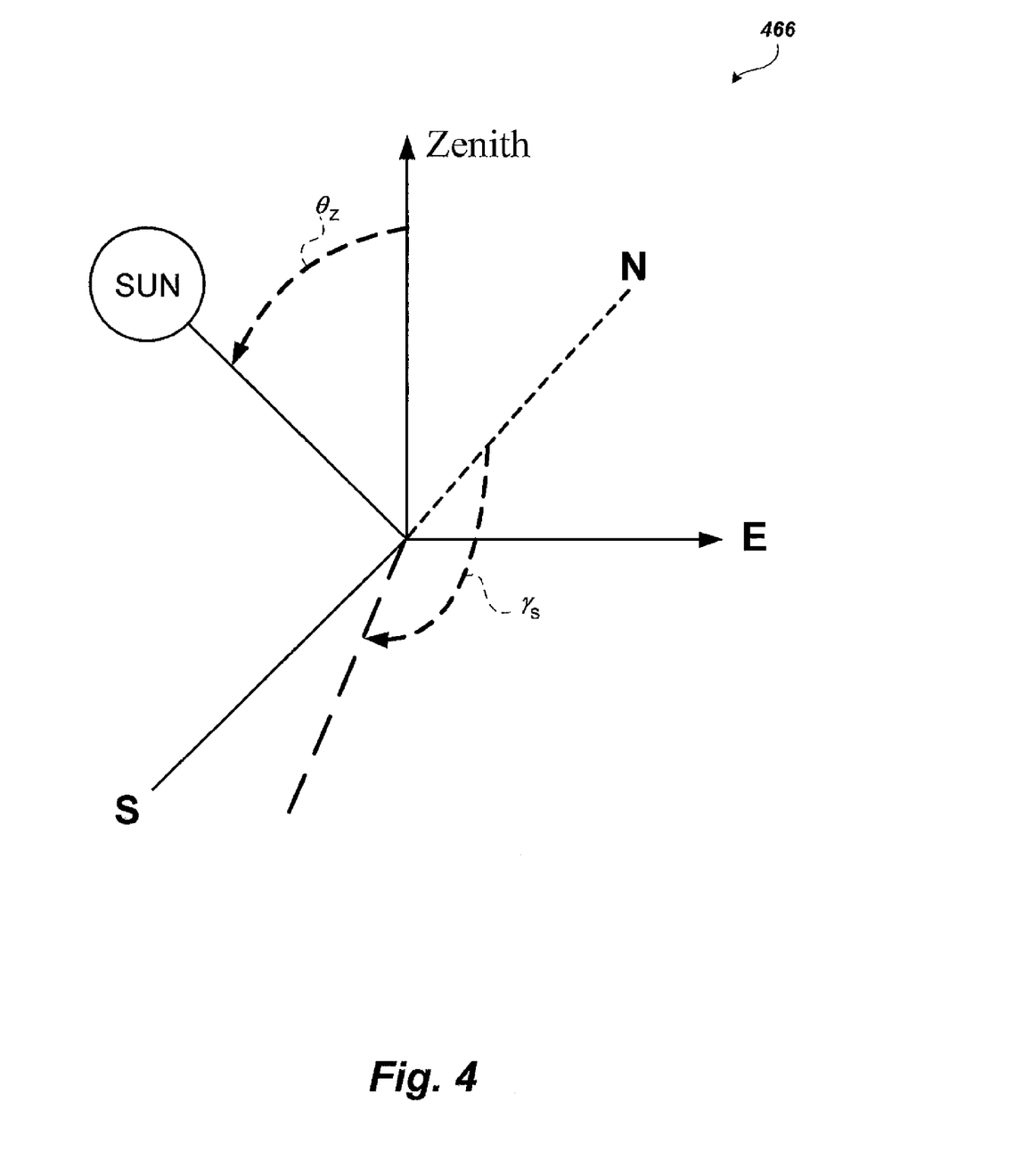
FIG. 4 is a diagram showing solar zenith and azimuth.

A first neural computational structure 203 is used to estimate the sun zenith angle, and the sun azimuth angle ($\theta_z$, $\gamma_s$) 208. The angles $\theta_z$, $\gamma_s$ are depicted in the coordinate diagram 466 of FIG. 4. The latitude and longitude are also normalized by a third non-linear transformation table 204. The normalized parameters are then processed by a second neural computation structure 205 to estimate the Earth's magnetic field declination $\Phi_m$ 207. The magnetic field declination angle 207 is then used to correct the compass reading 215 from the magnetic north $\Phi_{bc}$ to true north. Accordingly, true orientation of the base can then be described by the inclination angles ($\alpha_b$, $\theta_b$) 220 obtained from the inclination sensors, and the corrected angle to the geographic north $\Phi_b$ 209.

The correction unit 210 then uses the orientation of the base unit and the direction of the sun to compute the correct steering angles to the servo system 121. These command angles are basically the orientation of the solar array, (panel or reflector), with respect to its mounting base assembly, which would result in the correct positioning of the solar array with respect to the sun after correcting for misalignment of the base station.

Figure 3:
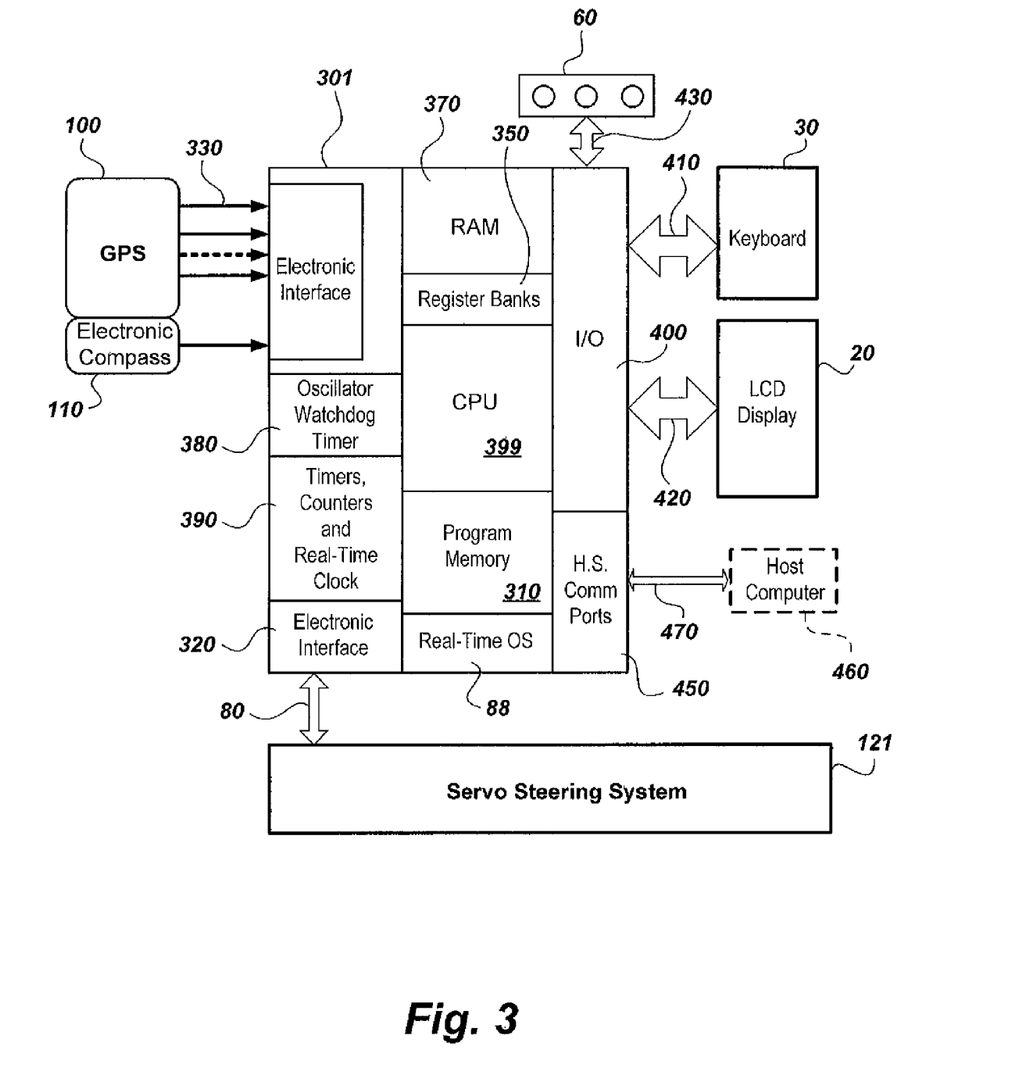
FIG. 3 is a block diagram of exemplary processor components of a system for automatic positioning of a solar array according to the present invention.

As illustrated in FIG. 3, the system features a controller chip 301 that includes a built in real-time calendar/clock 390, program memory 310, random access data memory 370, and a plurality of I/O interfaces 400 and digital communication channels 450. The central processing unit 399 may comprise a standard CPU and one or more neural computational structures, each having a plurality of perceptrons arranged in one or more layers or tree architecture. The neural computation structure 566, shown in FIG. 5, may also be implemented in firmware or software. The CPU 399 fetches instructions sequentially from the program memory 310 and executes them.

Figure 6A:
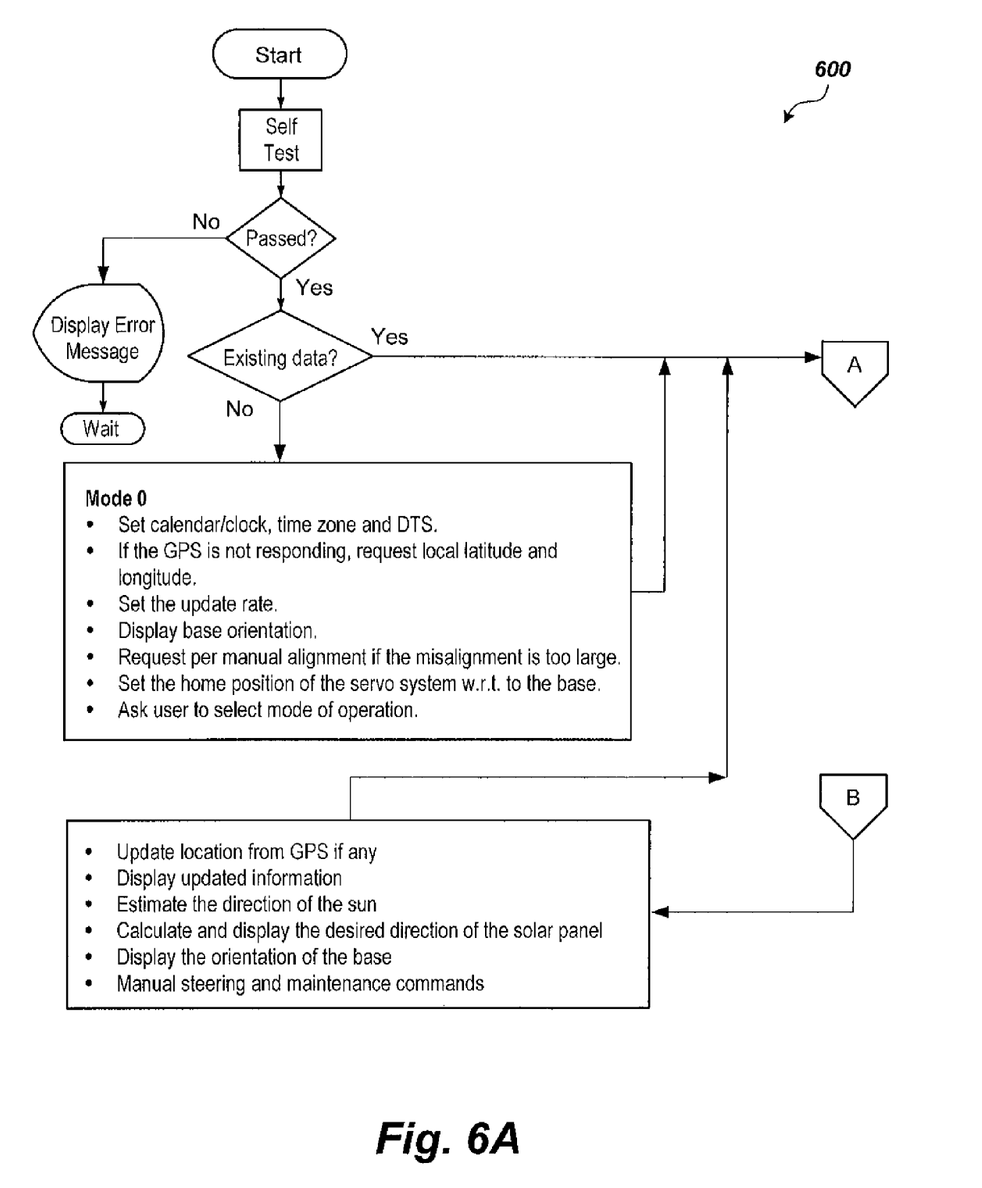
FIGS. 6A and 6B are a flowchart showing the operating modes and procedures of a system and method for automatic positioning of a solar array according to the present invention.
Figure 6B:
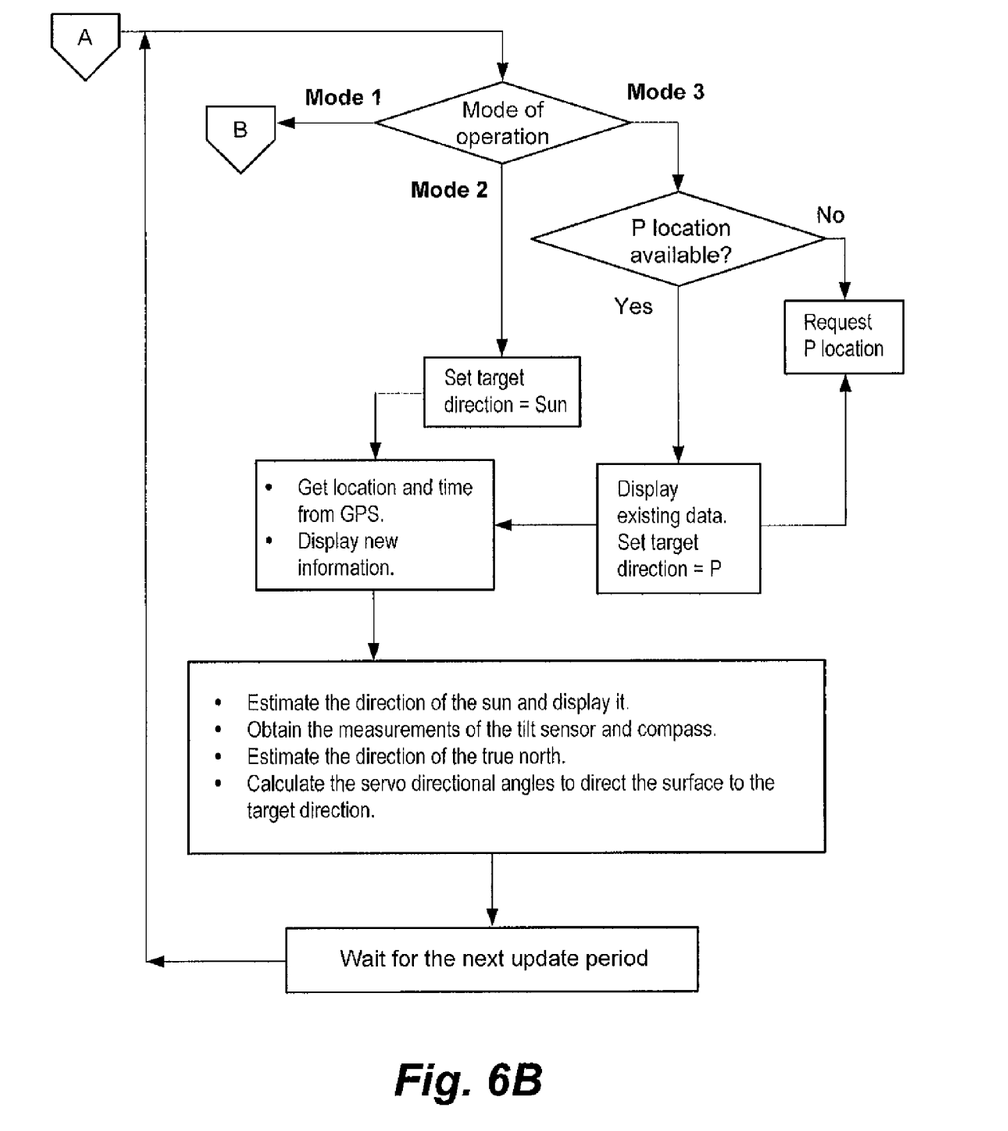

Program memory 310 stores the detailed computational steps of procedure 600, which is shown in the flowchart of FIGS. 6A and 6B. Moreover, the program memory 310 stores the non-linear transformation tables 201, 202, and 204. The results of execution can be stored temporarily in at least one bank of general purpose registers 350. The RAM memory 370 stores the various measurements, their scaled values, and their processed and transformed values. The RAM memory 370 may include volatile and non-volatile portions. The non-volatile memory stores the configuration parameters and the setup parameters, and the last position of the solar collector orientation. The volatile memory stores the current values, status values, and limited historical values for periodic reporting to a host computer, if needed. Execution timing is determined by a master CPU clock oscillator 380, which includes a special watchdog timer for producing an alarm and initiating a special reset sequence if the CPU 399 halts unexpectedly. The timer/counter unit 390 contains a number of programmable digital counters, which can be programmed to provide time delays and timing sequences for periodic execution of the operating procedure 600, and for scanning the keyboard, refreshing the displays, and for setting up communication speeds with other units. The GPS unit 100, the electronic compass 110, and the tilt sensor 121 are connected to the microcontroller unit via appropriate digital interfaces to processor 301.

The CPU 399 is internally connected to a number of digital input/output registers 40, which interface external devices via the digital I/O channels 410, 420, and 430. The I/O digital channels 410 are connected to a keyboard 30, which allows the operator to initialize operating parameters for the standard servo systems, set the internal calendar/clock, configure the software for a particular mode of operation, and for testing and maintenance purposes. The digital I/O channel 430 is used to derive a plurality of status/fault LED indicators 60. The digital I/O channels 420 interface the control board 301 to a local display unit 20. The display unit 60 displays status parameters, operating mode (manual, automatic, testing), values invoked by the operator, warning and error messages, and the measured values. In an online mode, the calculated values of the sun's direction and the desired solar collector orientation are displayed. The system may also be fitted with one or more digital communication controllers for high-speed communication links to other units, or to a host computer for monitoring and supervisory control. The interface unit and link 47 could be analog, digital, or a field bus.

Neural Networks are capable of capturing complex relations, and thus have proven to be effective modeling tools. Unlike the mathematical modeling technique, neural networks are built from existing training data about the particular physical relation to be modeled.

Figure 5:
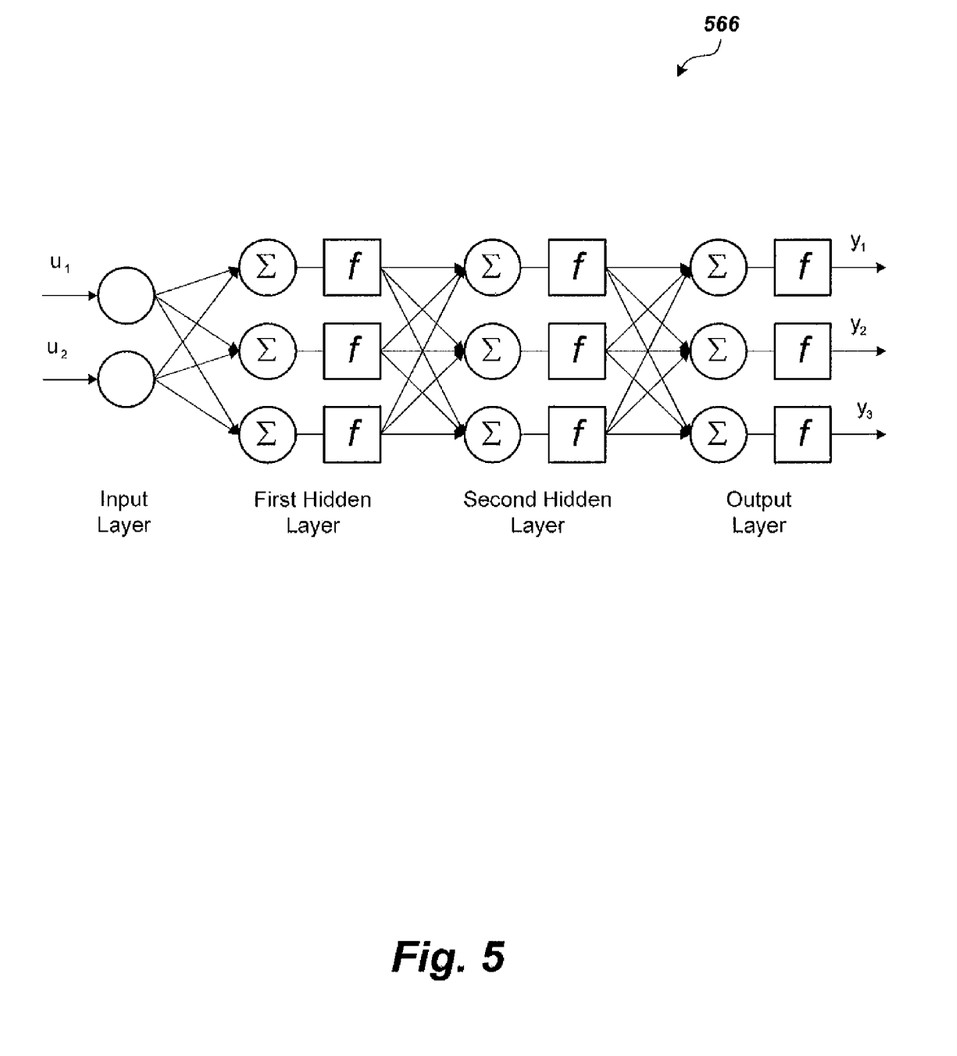
FIG. 5 is a block diagram showing the multi-layer feed forward neural network architecture of a system for automatic positioning of a solar array according to the present invention.

For example, a k-th neuron is described as:

$$v_k = \sum_{j=1}^{p} w_{kj}x_j + w_{k0} \quad (1)$$

and $$y_k = f(v_k)$$

where $x_1, x_2, \ldots x_p$, are the input signals, $w_{k1}, w_{k2}, \ldots w_{kp}$ are the synaptic weights of neuron k, $w_{k0}$ is a bias term, $v_k$ is the linear combiner output, f(.) is an activation function, and $y_k$ is the output signal of the neuron. As shown in FIG. 5, the automatic positioning system utilizes an exemplary multilayer perceptron Feed Forward Neural Network FFNN 566 architecture. However, other neural computation structures based on learning can also be used. FFNNs are composed of layers of interconnected neurons. Usually, an input layer, a number of hidden layers, and an output layer are configured in the manner that FFNN 566 is configured. The input layer is essentially a direct link to the inputs of the first hidden layer. The output of each neuron may be connected to the inputs of all the neurons in the next layer. Signals are unidirectional, i.e., they flow only from input to output.

In the automatic positioning method, a first FFNN is used to estimate the position of the sun ($\theta_z, \gamma_s$), instead of using a complex mathematical algorithm, such as the Sun Position Algorithm (SPA) of the National Renewable Energy Laboratory. The second neural network is used to estimate the Earth's magnetic field declination angle instead of using the complex algorithm of the National Geophysical Data Center.

The neural network modular structure greatly reduces the memory, execution time, and the computational complexity required of the microprocessor if implemented in firmware, and is simple to implement using field programmable gate arrays (FPGAs) or an application specific integrated circuit (ASIC) approach.

The actual first FFNN based on the structure of the exemplary FFNN 566 has a first hidden layer having forty neurons and a second hidden layer having ten neurons. The output layer contains two neurons. This computational structure provides the estimation of the sun position ($\theta_z, \gamma_s$) at its output. The first FFNN is trained using about 23,000 data points, and tested over 1000 points. The root mean square error is less than one degree.

The second neural network structure (also based on the exemplary FFNN 566) estimates the Earth's declination angle using latitude and longitude information. The second neural structure has one hidden layer of forty neurons, and an output layer of one neuron. The neural network is trained using about 9,000 data points, and tested over 1000 points. The root mean square error is less than 0.41°, and will remain accurate to within 1° for the next twenty years. After twenty years, the neural network needs to be retrained using fresh data from the National Geophysical Data Center. First and second feedforward neural networks use only the multiply instruction, the add instruction, and a look up table, which can be efficiently calculated using 16-, 24-, or 32-bit fixed point arithmetic.

Additionally, the solar array automatic positioning method may be accomplished by daily computational means. Given an input of date (month M, day D), current time (Hours Hr, Minutes Mn), time zone (Tz in hours), latitude ($\Phi$), and longitude (Ln), the day of the year and pointing angles are calculated as follows:

1. First, calculate the day of the year:

$N1 = \text{floor}(275 * \text{month}/9)$ $N2 = \text{floor}((\text{month}+9)/12)$ $N3 = (1+\text{floor}((\text{year}-4*\text{floor}(\text{year}/4)+2)/3))$ $N = N1-(N2*N3)+\text{day}-30$ 2. Define $B = (N-1)360/365$
3.

$$\delta = 23.45\sin\left(360\frac{284+N}{365}\right),$$

using a 365-point table of sine function

4. $\theta_{zmax}$: maximum Zenith angle = $\phi - \delta$.
5. Define Zuhr = Solar noon time (time of maximum zenith angle), and $\delta_2 = 12:00 - \text{Zuhr}$
6. Normalize ($\phi$, Ln, $\delta$, B) using non-linear transformation tables.
7. Use the normalized parameters as inputs to one or more Neural Network structures, such as the exemplary FFNN 566, to estimate one or more of the following parameters: sunrise time, sunset time, sunrise directional, $\delta_2$ or sunset directional.
8. The above calculations are performed only once each day.
9. To calculate the solar direction at any moment t, the system 10 uses the following simple calculations:

$\text{Zuhr} = 12:00 - \delta_2,$ $D = \text{Zuhr} - \text{sunrise time}$ $\theta_z(t) = \theta_{z\,max} - (t - \text{Zuhr})*\theta_{z\,max}/D$ after Zuhr until sunset;

$$\theta_z(t) = \theta_{z\,max} + (t - \text{Zuhr})*\theta_{z\,max}/D \text{ from sunrise to Zuhr:} \quad (2)$$

$$\delta_S(t) = (\text{Zuhr} - t)*15 \quad (3)$$

Let us define the transformation matrices due to rotation as follows $$T_{x,\theta} = \begin{bmatrix} \cos(\theta) & -\sin(\theta) & 0 \\ \sin(\theta) & \cos(\theta) & 0 \\ 0 & 0 & 0 \end{bmatrix} \quad (4)$$

$$T_{y,\alpha} = \begin{bmatrix} 1 & 0 & 0 \\ 0 & \cos(\alpha) & -\sin(\alpha) \\ 0 & \sin(\alpha) & \cos(\alpha) \end{bmatrix}$$

$$T_{z,\phi} = \begin{bmatrix} \cos(\phi) & 0 & \sin(\phi) \\ 0 & 1 & 0 \\ -\sin(\phi) & 0 & \cos(\phi) \end{bmatrix}$$

Let $R_0$ be a terrestrial reference axis, $x_0$, $y_0$, and $z_0$, where $y_0$ points north, $x_0$ points east, and $z_0$ is perpendicular to the horizontal surface.

The solar panel surface axes are such that $y_p$ is perpendicular to the panel surface, the panel pitch is $\theta_p$ about its $x_p$ axis, and the panel yaw is $\Phi_p$. We want to determine $\Phi_p$ and $\theta_p$ to orient $y_p$ along desired direction. The panel is mounted on a base or body having axes $x_b$, $y_b$, and $z_b$ that are subject to body rotation $\Phi_b$ (yaw), $\alpha_b$ (roll), $\theta_b$ (pitch) about the z axis. $\Phi_b$ is the angle between body $y_b$ and the north, and is determined by the compass (after correction of the Earth's magnetic declination). On the other hand $\alpha_b$ and $\theta_b$ are obtained from the tilt sensor.

A unit vector in the direction of the sun with respect to $R_0$ is given by:

$$\underline{S}_0[\sin(\theta_z)\sin(\gamma_s)\sin(\theta_z)\cos(\gamma_s)\cos(\theta_z)]' \quad (5)$$

while the desired direction of the sun with respect to the surface of the panel is given by:

$$\underline{S}_P = [0)10]' \quad (6)$$

The system 10 must find the transformation of the panel with respect to the base so that the panel will be directed to the sun, taking into consideration the possible misalignment of the base. The relationship between the sun directions with respect to the panel and $R_0$ is related to the axis transformation as follows:

$$\underline{S}_0 = [{}^{R_0}T_B][{}^{B}T_P]\underline{S}_P \quad (7)$$

where the transformation matrix $[{}^{R_0}T_B]$ of the base body axis is given by the sequence of rotations:

$${}^{R_0}T_B = [{}^{R_0}T_{z,\phi_b}][{}^{R_0}T_{x,\theta_b}][{}^{R_0}T_{y,\alpha_b}] \quad (8)$$

and where $(\alpha_b, \theta_b)$ are obtained from the tilt sensor, and $\Phi_b$ is the orientation of the body with respect to true north, which is obtained from the electronic compass after correction for the Earth's magnetic field declination.

$[{}^{B}T_P]$ is the transformation matrix of the solar panel with respect to the base body axis, and is determined by first finding the position of the sun with respect to the body:

$$\underline{S}_b = [{}^{R_0}T_B]^{-1}\underline{S}_0 = [{}^{B}T_{R_0}]\underline{S}_0 = \begin{bmatrix} x_b \\ y_b \\ z_b \end{bmatrix} \quad (9)$$

and then finding the direction of orientation of the panel with respect to the base frame:

$$S_b = \begin{bmatrix} x_b \\ y_b \\ z_b \end{bmatrix} = [{}^{B}T_P]\begin{bmatrix} 0 \\ 1 \\ 0 \end{bmatrix} \quad (10)$$

The system solves equation (7), yielding the rotation commands, i.e., the rotations of the panels with respect to the base body, which get transmitted to the servo 121. Furthermore, $$\Phi_p = \arcsin(z_b); \theta_p = -a\tan(x_b/y_b) \quad (11)$$

The above algorithm is exemplary only, and other versions of the algorithm derived from straight forward mathematical manipulations of the basic equations could be utilized by the present system and method.

Figure 7:
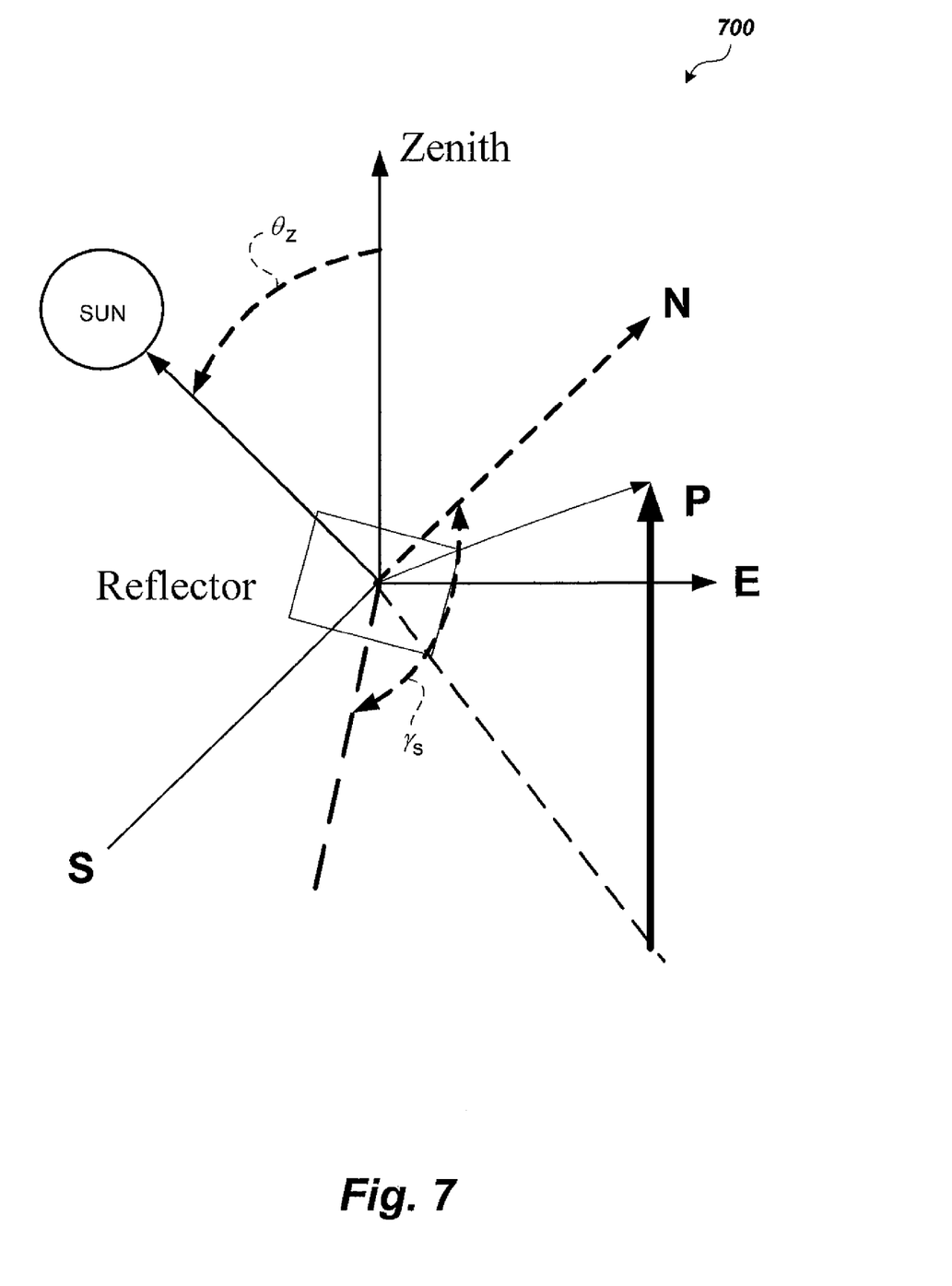
FIG. 7 is a diagram illustrating calculation of sunbeam direction in a method for automatic positioning of a solar array according to the present invention.

The system 10 can also be made to steer a mirror/solar collector (known as a heliostat) to direct the solar energy towards the position of a solar receiver, or to steer a solar receiver to the focal point of solar beams from a fixed mirror/reflector structure. In this mode of operation, the system 10 interrogates for and accepts user entry of the relative position of the solar receiver with respect to the base point. The system 10 then calculates the proper steering directions of solar reflectors to direct the solar energy towards a solar receiver at a position P, as shown in coordinate diagram 700 of FIG. 7, relative to the reference fixed axis at the solar reflector base, which is also assumed to be the location of the device.

Let the Cartesian position of the solar receiver be:

$$P = p_x\underline{x} + p_y\underline{y} + p_z\underline{z} \quad (12)$$

The solar beam needs to be directed to the solar receiver. The unit vector of the solar beam is given by Equation (2) as:

$$\underline{S}_0 = [\sin(\theta_z)\sin(\gamma_s)\sin(\theta_z)\cos(\gamma_s)\cos(\theta_z)]'$$

Let $\hat{P} = p_x\underline{x} + p_y\underline{y} + p_z\underline{z}$ be a unit vector in the direction of the solar collector. Accordingly, the direction of the unit vector of the normal to the solar reflector surface is given by:

$$C = c_x\underline{x} + c_y\underline{y} + c_z\underline{z} = \frac{1}{2}\frac{(\underline{S}_0 - \hat{P})}{|(\underline{S}_0 - \hat{P})|} \quad (13)$$

$$\hat{C} = \frac{C}{|C|}$$

The reflector surface is now required to be directed to $\hat{C}$ instead. Thus:

$$\hat{C} = [{}^{R_0}T_b][{}^{B}T_P]\underline{S}_P \quad (14)$$

The desired steering angles of the reflector surface with respect to the base body can then be obtained using the steps outlined in Equations (6), (7), and (8).

The main part of operating method 600 is illustrated in FIGS. 6A-6B. The exemplary four operating modes of system 10 are MODE 0, the initialization, which is invoked when the system is used for the first time or if it is reset; MODE 1, the manual mode for maintenance and testing; MODE 2, the automatic steering of a solar array; and MODE 3, the reflectors/mirrors steering mode to aim the sun beam towards solar collectors.

Whenever the system 10 starts, it performs a self-test on the CPU 399, program memory 310, and the connected sensors 110, 110 and 121. The system 10 then reports any error that is found. If the self-test passed, it checks whether location information is already stored in the non-volatile memory portion of RAM 370. If the system finds valid information, the LCD 20 displays the location latitude and altitude, local time, and the last direction of the sun. The system 10 automatically proceeds to the last operating mode. If it does not find valid information, it invokes MODE 0, and requests and accepts internal calendar/clock, Day Time Saving (DTS) and time zone information from the user. The system 10 also checks the GPS 100 and tries to obtain the local latitude, longitude and time. The user sets the desired directional update rate and enters the parameters and limits associated with servo system 121. If the GPS 100 is not found or there is a communication problem, the system 10 asks the user to enter local Latitude and Longitude. The system 10 also obtains the measurements from outputs of the tilt sensor 121 and the electronic compass 110. These readings will then be available for display and review by the user. If the tilt or the orientation of the base is too large, the system 10 guides the user to re-align the base. The system then uses the first non-linear transformation table 202 and the second non-linear transformation table 201 to normalize the day and time information, and the latitude and longitude. The normalized parameters are then processed to the first neural network structure to estimate the direction of the sun $(\theta_x, \gamma_s)$ 208.

Similarly, the latitude and longitude information are then normalized using the third non-linear transformation table 204, and processed by the second neural network structure to estimate the magnetic field inclination to obtain the base orientation with respect to true north. Finally, the system 10 calculates the control command to be sent to the servo system 121 for steering the solar panel (or reflector) to face the sun. The system 10 then displays the information for the user to review, and waits for user input to start execution of the steering commands. The user may also choose to manually steer the panel using the arrow keys on the operating panel to make sure that all parts of the system are working properly. Next, the system waits for the user to select the desired operating mode of the device.

If MODE 1 is selected, the device menu will be similar to MODE 0, where the user can display and check latitude and longitude values from the GPS, time and date, the measurements of the tilt sensor, the measurements compass, and the local Earth's magnetic declination. The device also can display the desired command angles to orient the solar panel to face the sun. However, if the information about the direction of a solar collector is found, the desired orientation of the reflector surface will be calculated and displayed instead. At the end of the maintenance session the operator can select to go back to MODE 2 or MODE 3.

In MODE 2, the system periodically updates the base location from the GPS unit, tilt measurements from the tilt sensor, and orientation measurement from the compass unit. It then proceeds to calculate the steering commands and automatically sends the commands to the servo system.

MODE 3 is similar to MODE 2, except that the MODE 3 objective is to orient the surface to direct the solar beam towards a solar collector, as outlined above. When the system is placed in this mode for the first time, it requests that the user enter the location of the solar collector (Cartesian coordinates), or its direction (in polar coordinates), and then the device proceeds to periodically execute the MODE 3 procedure.

It is to be understood that the present invention is not limited to the embodiments described above, but encompasses any and all embodiments within the scope of the following claims.

I claim:

1. A computer-implemented method for automatic positioning of a solar array attached to a base unit, comprising the steps of:
    calculating a first set of parameters including the latitude and longitude of the base unit;
    calculating a second set of parameters including the local date and time;
    normalizing the first set of parameters using a first transformation table;
    normalizing the second set of parameters using a second transformation table;
    training a first neural network with existing sun directional data;
    processing the normalized first set of parameters and the normalized second set of parameters using the first neural network to obtain an output including an estimate of the sun's direction in terms of azimuth angle and zenith angle of the sun;
    processing the estimated sun direction information to determine servo steering commands for at least one solar beam tracking assembly; and
    sending the servo steering commands to a servomechanism attached to the solar array, thereby directing the solar array to align surfaces of the solar array with the sun for receiving maximum available solar energy.

2. The computer-implemented method for automatic positioning of a solar array according to claim 1, further comprising the step of automatically determining the latitude, longitude, and local time of the base unit using outputs from a GPS unit.

3. The computer-implemented method for automatic positioning of a solar array according to claim 1, further comprising the steps of:
    automatically determining orientation of the base unit with respect to magnetic north using outputs from an electronic compass;
    normalizing the local latitude and longitude using a third transformation table;
    processing the normalized local latitude and longitude by a second neural network to obtain an estimate of the Earth's magnetic field declination angle;
    automatically determining the correct orientation of the base unit with respect to true geographic north using the Earth's magnetic field declination angle; and
    automatically compensating for steering errors due to any misalignment of the base unit using the automatically determined base unit orientation.

4. The computer-implemented method for automatic positioning of a solar array according to claim 3, wherein said step of automatically compensating for steering errors further comprises the step of accepting base tilt information from at least one tilt sensor associated with said base unit.

5. The computer-implemented method for automatic positioning of a solar array according to claim 1, further comprising the steps of:
    accepting user entry of solar receiver position relative to the position of the base unit;
    continuously calculating an optimal orientation of at least one array of solar reflectors to direct solar energy reflected by the at least one solar reflector array to the solar receiver; and
    sending the calculated positions to servomechanisms operably connected to the at least one solar reflector array.

6. The computer-implemented method for automatic positioning of a solar array according to claim 1, wherein the solar array includes at least one array of photovoltaic solar panels.

7. The computer-implemented method for automatic positioning of a solar array according to claim 1, further comprising the steps of:
    displaying menus and step-by-step instructions to guide a user through operation of a device implementing the method, said step-by-step instructions including instructions for alignment of the device;
    displaying measured parameters and computed parameters responsive to requests from the user;
    accepting user entry of position data of a companion solar collector; and
    sending steering commands to the servo systems responsive to user commands to the device.

8. The computer-implemented method for automatic positioning of a solar array according to claim 1, further comprising the step of sending positioning commands to a plurality of solar beam tracking assemblies via a high-speed digital communication link.

9. The computer-implemented method for automatic positioning of a solar array according to claim 1, further comprising the step of communicating with a remote host computer for monitoring and supervisory control.

10. The computer-implemented method for automatic positioning of a solar array according to claim 1, further comprising the step of estimating at least one of the second set of parameters based on processing the first set of parameters, the second set of parameters including sunset time, sunrise time, meridian time, and sun zenith angle at solar noon, the estimating step utilizing an interpolation equation to continuously update an estimation of the direction of the sun for a sun angular velocity of 15° per hour.

11. A system for automatic positioning of a solar array attached to a base unit, the system comprising:
means for calculating a first set of parameters including latitude and longitude of the base unit and a second set of parameters including local date and time;
means for normalizing the first set of parameters using a first transformation table;
means for normalizing the second set of parameters using a second transformation table;
a first neural network;
means for training the first neural network with existing sun directional data;
means for processing the normalized first set of parameters and the normalized second set of parameters using the first neural network in order to obtain an output including an estimate of the sun's direction in terms of azimuth angle and zenith angle of the sun;
means for processing the estimated sun direction information to determine servo steering commands for one or more solar beam tracking assemblies; and
means for sending the servo steering commands to a servomechanism attached to the solar array, thereby directing the solar array to align surfaces of the solar array with the sun for receiving maximum available solar energy.

12. The system for automatic positioning of a solar array according to claim 11, further comprising a global positioning system (GPS) unit and means for automatically determining the latitude, longitude, and local time of the base unit using outputs from the GPS unit.

13. The system for automatic positioning of a solar array according to claim 11, further comprising:
an electric compass;
means for automatically determining orientation of the base unit with respect to magnetic north using outputs from the electronic compass;
means for normalizing the local latitude and longitude using a third transformation table;
a second neural network;
means for processing the normalized local latitude and longitude by the second neural network, the second neural network providing an estimate of the Earth's magnetic field declination angle;
means for automatically determining the orientation of the base unit with respect to true geographic north using the Earth's magnetic field declination angle; and
means for automatically compensating for steering errors due to any misalignment of the base unit using the base unit orientation with respect to true north.

14. The system for automatic positioning of a solar array according to claim 13, wherein said means for automatic steering error compensation further comprises at least one tilt sensor and means for accepting base tilt information from the at least one tilt sensor.

15. The system for automatic positioning of a solar array according to claim 11, further comprising:
means for accepting user entry of solar receiver position relative to the position of the base unit;
means for continuously calculating an optimal orientation of at least one array of solar reflectors to direct solar energy reflected by the solar reflector array to the solar receiver; and
means for sending the calculated positions to servomechanisms operably connected to the solar reflector array.

16. The system for automatic positioning of a solar array according to claim 11, wherein the solar array includes at least one array of photovoltaic solar panels.

17. The system for automatic positioning of a solar array according to claim 11, further comprising:
means for displaying menus and step-by-step instructions to guide a user through operation of the system, the step-by-step instructions including instructions for alignment of the system;
means for displaying measured parameters and computed parameters responsive to requests from the user;
means for accepting user entry of position data for a companion solar collector; and
means for sending steering commands to said servo systems responsive to user commands to the system.

18. The system for automatic positioning of a solar array according to claim 11, further comprising a high speed digital communication link for sending positioning commands to a plurality of solar beam tracking assemblies.

19. The system for automatic positioning of a solar array according to claim 11, further comprising means for communicating with a remote host computer for monitoring and supervisory control.

20. The system for automatic positioning of a solar array according to claim 11, further comprising means for estimating at least one of the second set of parameters based on processing the first set of parameters, the second set of parameters including sunset time, sunrise time, meridian time, and sun zenith angle at solar noon, the means for estimating including means for utilizing an interpolation equation to continuously update an estimation of the direction of the sun for a sun angular velocity of 15° degrees per hour.

* * * * *